(12) United States Patent
Takakura et al.

(10) Patent No.: US 8,886,717 B2
(45) Date of Patent: *Nov. 11, 2014

(54) CLIENT DEVICE, INFORMATION PROCESSING SYSTEM AND ASSOCIATED METHODOLOGY OF ACCESSING NETWORKED SERVICES

(71) Applicants: Sony Corporation, Tokyo (JP); Sony Electronics Inc., Park Ridge, NJ (US)

(72) Inventors: Hiroki Takakura, Tokyo (JP); Anna Gershnik, Park Ridge, NJ (US); Brian Beaver, Park Ridge, NJ (US); Charles McCoy, Park Ridge, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,680

(22) Filed: Jul. 3, 2013

(65) Prior Publication Data

US 2013/0297682 A1 Nov. 7, 2013

Related U.S. Application Data

(63) Continuation of application No. 12/995,619, filed as application No. PCT/US2009/051840 on Jul. 27, 2009, now Pat. No. 8,682,963.

(60) Provisional application No. 61/086,235, filed on Aug. 5, 2008, provisional application No. 61/137,241, filed on Jul. 28, 2008.

(51) Int. Cl.
*H04L 29/08* (2006.01)
*G06Q 10/06* (2012.01)

(52) U.S. Cl.
CPC ................................ *H04L 67/10* (2013.01); *G06Q 10/06* (2013.01)
USPC ........................................................ 709/203

(58) Field of Classification Search
CPC ................................ H04L 67/10; G06Q 10/06
USPC ........................................................ 709/203
See application file for complete search history.

(56) References Cited

U.S. PATENT DOCUMENTS 5,913,061 A 6/1999 Gupta et al.
6,094,688 A 7/2000 Mellen-Garnett et al.
(Continued)

FOREIGN PATENT DOCUMENTS

CN 1367450 A 9/2002
CN 1638358 A 7/2005
(Continued)

OTHER PUBLICATIONS

International Search Report Issued Jan. 29, 2010 in PCT/US09/051840 filed Jul. 27, 2009.

(Continued)

*Primary Examiner* — Kostas Katsikis
(74) *Attorney, Agent, or Firm* — Oblon, Spivak, McClelland, Maier & Neustadt, L.L.P.

(57) ABSTRACT

A system provides access to services from different servers via a common API. The system includes service-offering servers, a client that uses services offered by the service-offering servers, and an interchange server that acts as an intermediary when the client uses a service. The client communicates with the interchange server using a common API when the client uses service from the service-offering servers. The interchange server uses a unique API, which is unique to the service-offering server that offers the service being used by the client, to execute a processing sequence that is unique to the service-offering server. Thus client is able to use services offered by the service-offering servers with the use of a common API and without any need to use a different unique API for each service-offering server.

18 Claims, 16 Drawing Sheets

(56) References Cited

U.S. PATENT DOCUMENTS

| | | |
|---|---|---|
| 6,199,111 B1 | 3/2001 | Hara et al. |
| 6,745,388 B1 | 6/2004 | Gupta et al. |
| 6,957,438 B1 | 10/2005 | Travostino et al. |
| 7,096,248 B2* | 8/2006 | Masters et al. ............... 709/201 |
| 7,222,359 B2* | 5/2007 | Freund et al. ................... 726/3 |
| 7,296,023 B2* | 11/2007 | Geyer et al. ......................... 1/1 |
| 7,460,151 B2 | 12/2008 | Minatogawa |
| 2002/0035605 A1* | 3/2002 | McDowell et al. ........... 709/206 |
| 2002/0042759 A1 | 4/2002 | Takatsu et al. |
| 2002/0087601 A1 | 7/2002 | Anderson et al. |
| 2002/0178215 A1 | 11/2002 | Laksono et al. |
| 2003/0105811 A1* | 6/2003 | Laborde et al. ............... 709/203 |
| 2005/0213147 A1 | 9/2005 | Minatogawa et al. |
| 2006/0036509 A1 | 2/2006 | Takatsu et al. |
| 2007/0067495 A1 | 3/2007 | Levy |
| 2007/0088747 A1 | 4/2007 | Cheng et al. |
| 2008/0086564 A1* | 4/2008 | Putman et al. ................ 709/227 |
| 2008/0209451 A1 | 8/2008 | Michels et al. |
| 2008/0297607 A1 | 12/2008 | Minatogawa |
| 2009/0192847 A1 | 7/2009 | Lipkin et al. |
| 2014/0059122 A1* | 2/2014 | Zombek et al. ............... 709/203 |

FOREIGN PATENT DOCUMENTS

| | | |
|---|---|---|
| DE | 10 2006 004 431 A1 | 8/2007 |
| EP | 0 853 277 A2 | 7/1998 |
| EP | 1280104 A2 | 1/2003 |
| EP | 1302846 A2 | 4/2003 |
| JP | 2000-003367 A | 1/2000 |
| JP | 2001-331328 A | 11/2001 |
| JP | 2004-112115 A | 4/2004 |
| JP | 2006-252152 A | 9/2006 |
| JP | 2006-252453 A | 9/2006 |
| WO | WO 9833307 A1 * | 7/1998 |
| WO | WO 2004/070657 A1 | 8/2004 |
| WO | WO 2005/065009 A2 | 7/2005 |
| WO | WO 2007/088109 A1 | 8/2007 |

OTHER PUBLICATIONS

Extended European Search Report issued Dec. 20, 2011, in Patent Application No. 09803438.2.

Office Communication pursuant to Rules 70(2) and 70a(2) EPC issued Jan. 6, 2012, in European Application No. 09803438.2.

Combined Office Action and Search Report issued Jan. 14, 2013 in Chinese Application No. 200980128357.5 (With English Translation).

Hornfeldt, et al., "CommBridge-an enterprise application architecture for electronic government," Local Computer Networks, 1998. LCN '98. Proceedings., 23rd Annual Conference on , vol., No., pp. 270, 277, Oct. 11-14, 1998.

Office Action issued Jul. 24, 2013, in Japanese Patent Application No. 2011-521218 with English translation.

Office Action issued Sep. 24, 2013 in Japanese Patent Application No. 2011-521217 (with English language translation).

* cited by examiner

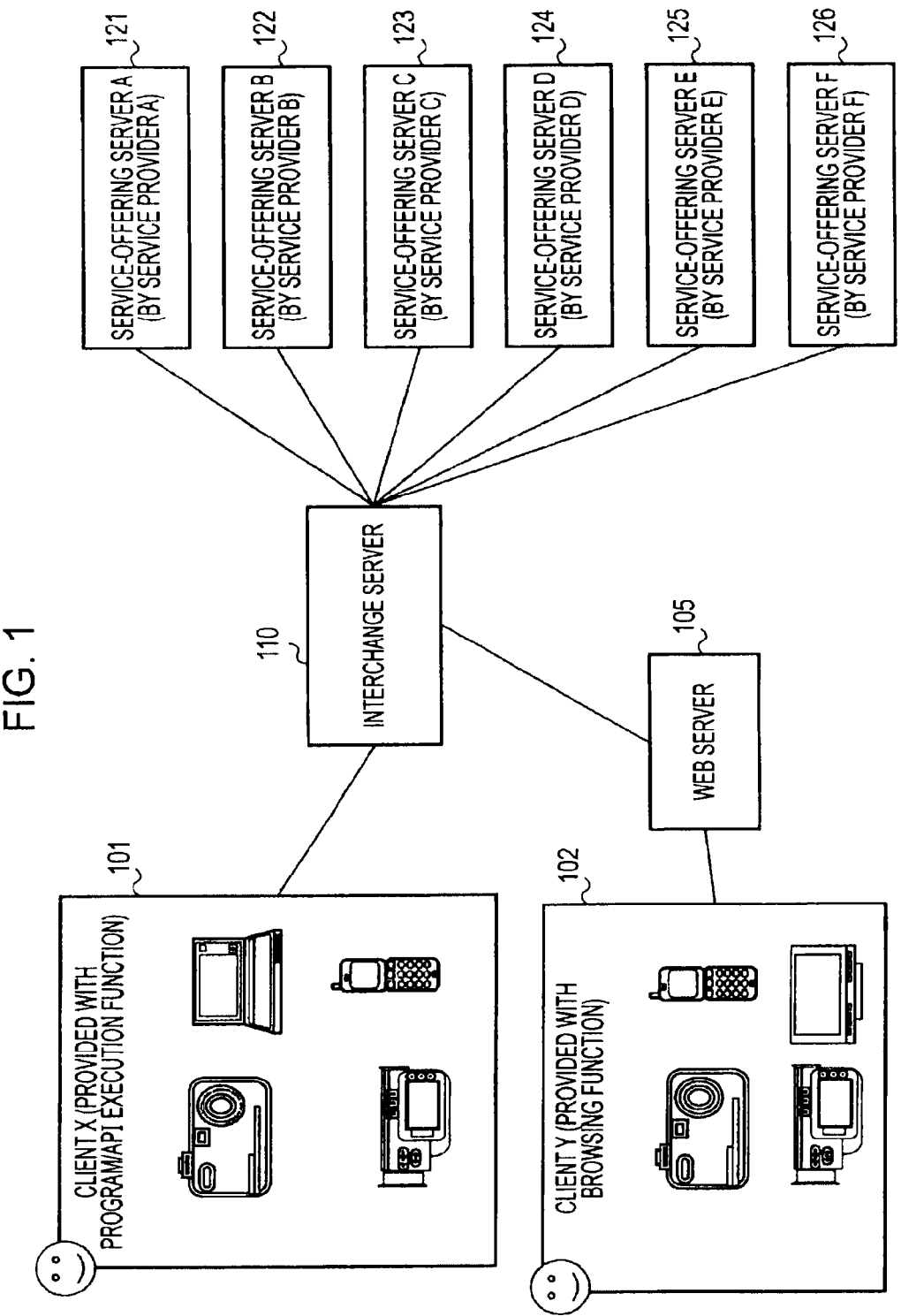

FIG. 2

| | COMPATIBLE PICTURE FORMAT | | PUBLIC/NON-PUBLIC SETTING | ALBUM FUNCTION | ALBUM TITLE ENTRY | IMAGE TITLE ENTRY | IMAGE DESCRIPTION ENTRY | TAG ENTRY | LOG-IN PARAMETER |
|---|---|---|---|---|---|---|---|---|---|
| | STILL PICTURE | MOVING PICTURE | | | | | | | |
| SERVICE A | ○ | × | ○ | ○ | ○ | ○ | ○ | × | ID / PASSWORD |
| SERVICE B | ○ | × | ○ | ○ | ○ | ○ | ○ | × | E-MAIL ADDRESS / PASSWORD |
| SERVICE C | ○ | × | ○ | ○ | ○ | ○ | ○ | × | ID / PASSWORD |
| SERVICE D | × | ○ | ○ | × | — | ○ | × | ○ | AUTHENTICATION KEY |
| SERVICE E | × | ○ | × | × | — | ○ | × | ○ | ID / PASSWORD |
| SERVICE F | ○ | ○ | ○ | × | — | ○ | × | × | ID / PASSWORD / E-MAIL ADDRESS |

FIG. 3

| | STILL PICTURE MAXIMUM SIZE | MOVING PICTURE MAXIMUM SIZE | MOVING PICTURE MAXIMUM TIME | MAXIMUM NUMBER OF CONTENT | SERVICE LOGO | SERVICE TRADEMARK CREDIT LINE | UPLOAD ORDER | SERVER-SIDE AUTOMATIC PROCESSING |
|---|---|---|---|---|---|---|---|---|
| SERVICE A | 5MB | — | — | 50 | serviceA.jpg | The service A is a registered trademark of ···. | NORMAL ORDER | If a tag input is missing, "Sony Image" is automatically added. |
| SERVICE B | 5MB | — | — | 100 | serviceB.jpg | — | NORMAL ORDER | The category "Home Video" is automatically selected. |
| SERVICE C | 10MB | — | — | 100 | serviceC.jpg | — | REVERSE ORDER | If a tag input is missing, "Sony Image" is automatically added. |
| SERVICE D | — | 100MB | 10 MIN. | 20 | serviceD.jpg | — | NORMAL ORDER | If an image title input is missing, a file name is automatically added. |
| SERVICE E | — | 100MB | 10 MIN. | 20 | serviceE.jpg | The service F is a registered trademark of ···. | REVERSE ORDER | No automatic processing is performed. |
| SERVICE F | 10MB | 100MB | 5 MIN. | 10 | serviceF.jpg | The service F is a registered trademark of ···. | REVERSE ORDER | No automatic processing is performed. |

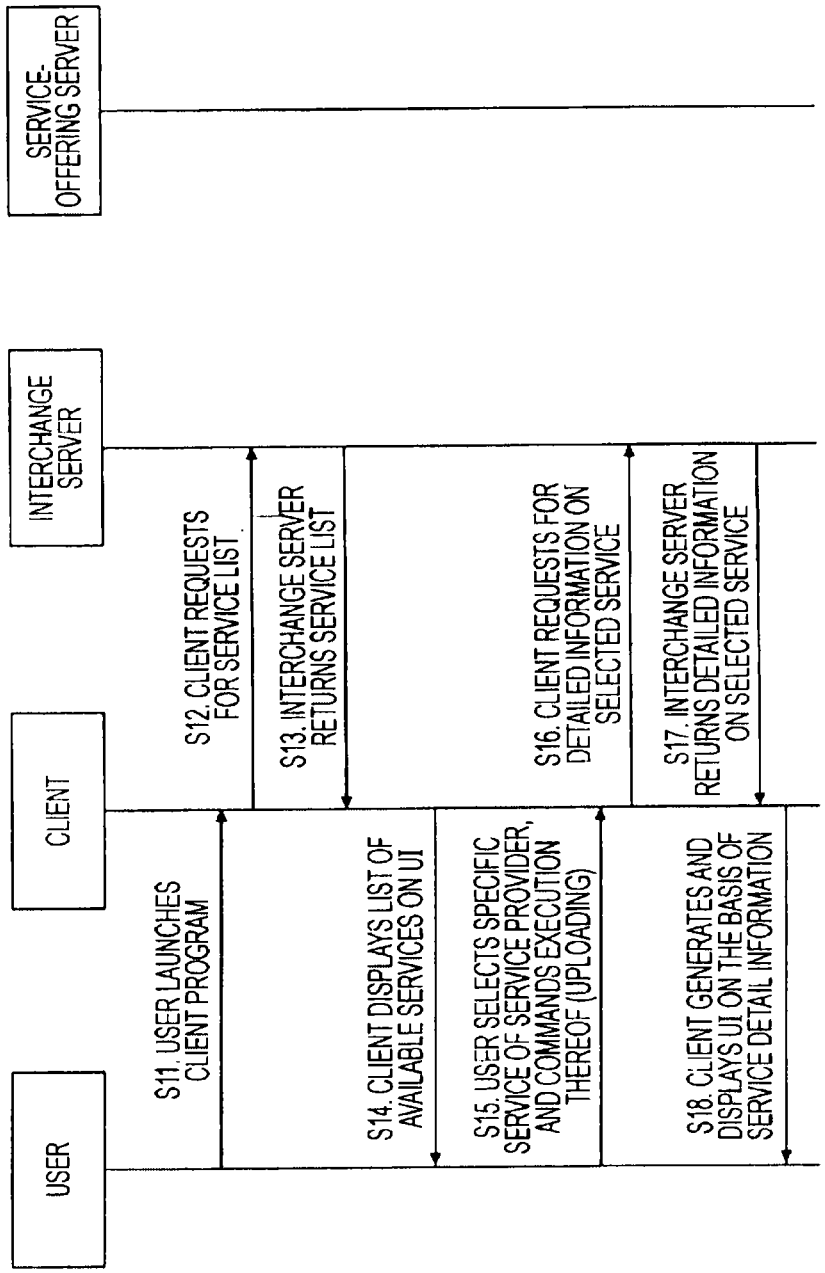

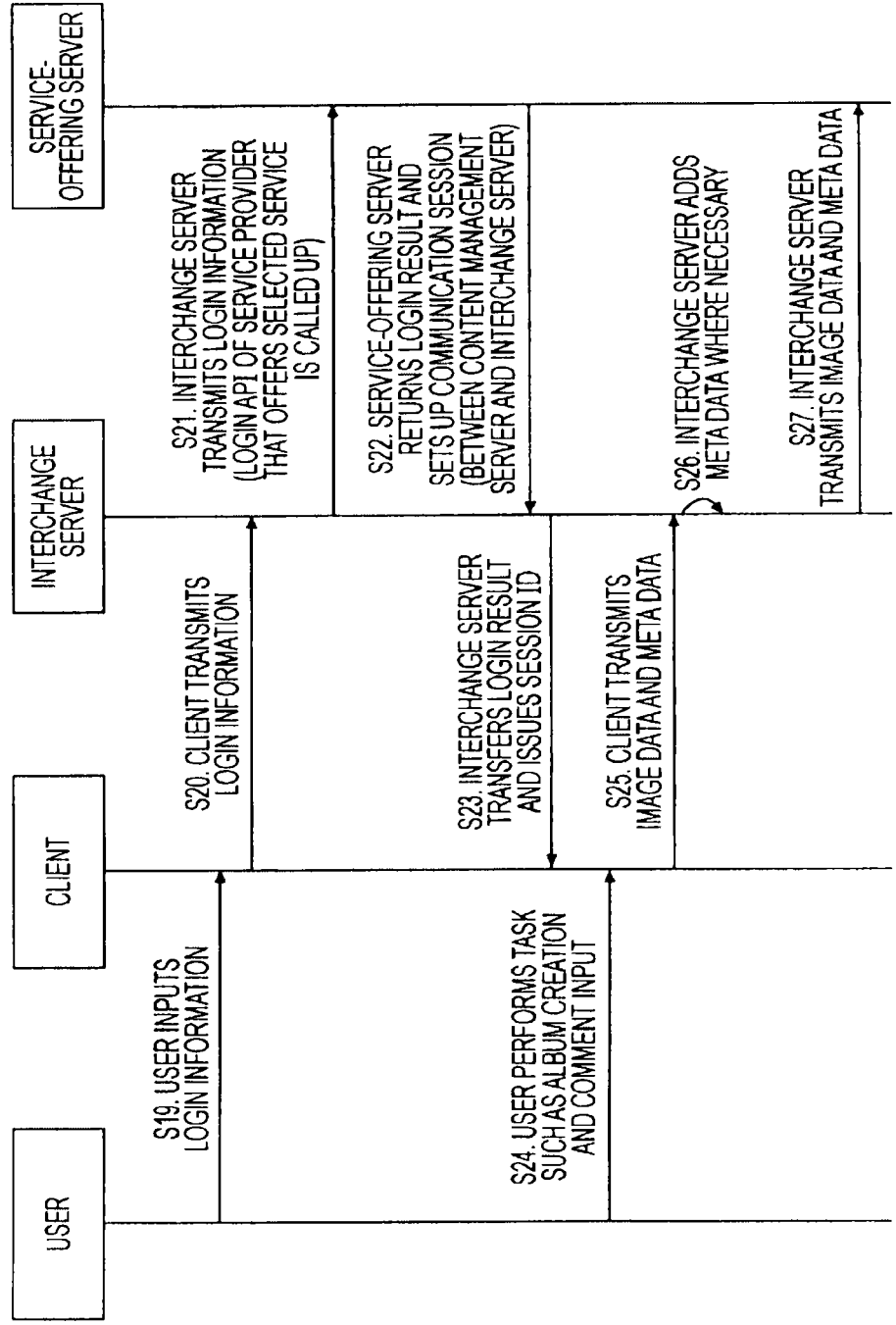

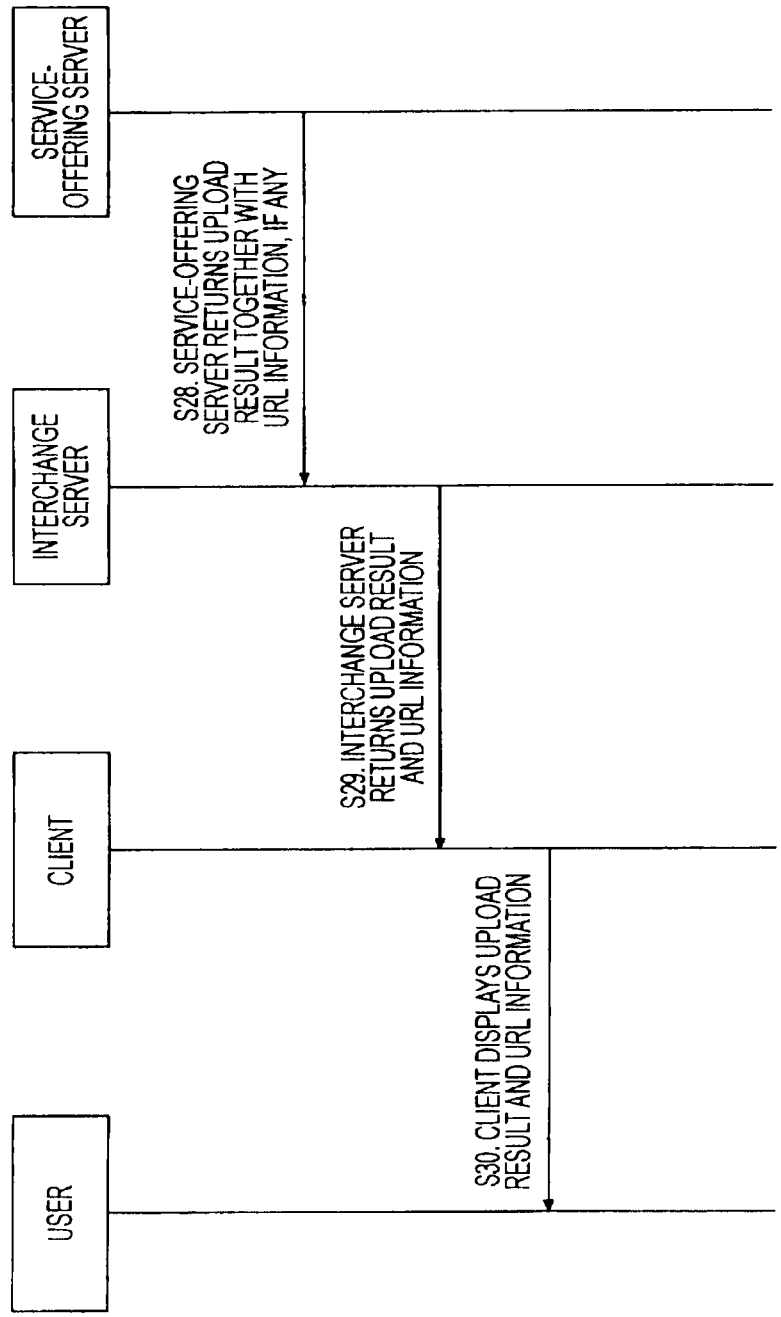

FIG. 7

```xml
<?xml version="1.0" encoding="utf-8" ?>
<response version="1">
<service id="ServiceA">
<copyright />
<description />
<eula />
<help_text />
<help_url />
<icon>http://ServiceA/icon.ico</icon>
<logo height="100" width="200">http://ServiceA/logo.jpg</logo>
<methods>
<method name="albums" />
<method name="image" />
<method name="assets" />
<method name="login">
<input name="email" required="1" title="E MAIL" type="text" />
<input name="password" required="1" title="PASSWORD" type="password " />
</method>
<method name="newalbum">
<input maxlength="100" name="album_name" required="1" title="album_name" type="text" />
<input maxlength="1000" name="description" title="description" type="text" />
<select name="access" title="access">
<option selected="1" title="private" value="private" />
<option title="public" value="public" />
</select>
</method>
<method name="upload">
<content_type>jpeg</content_type>
<input maxlength="1024" name="description" title="description" type="text" />
<max_image_size>20971520</max_image_size>
<wide>1</wide>
</method>
</methods>
<name> ServiceA </name>
<trademark> The serviceA is a registered trademark of Service A. Inc. </trademark>
<types>
<type>image</type>
</types>
<url>http:// ServiceA web. ServiceA .co.jp/</url>
</service>
</response>
```

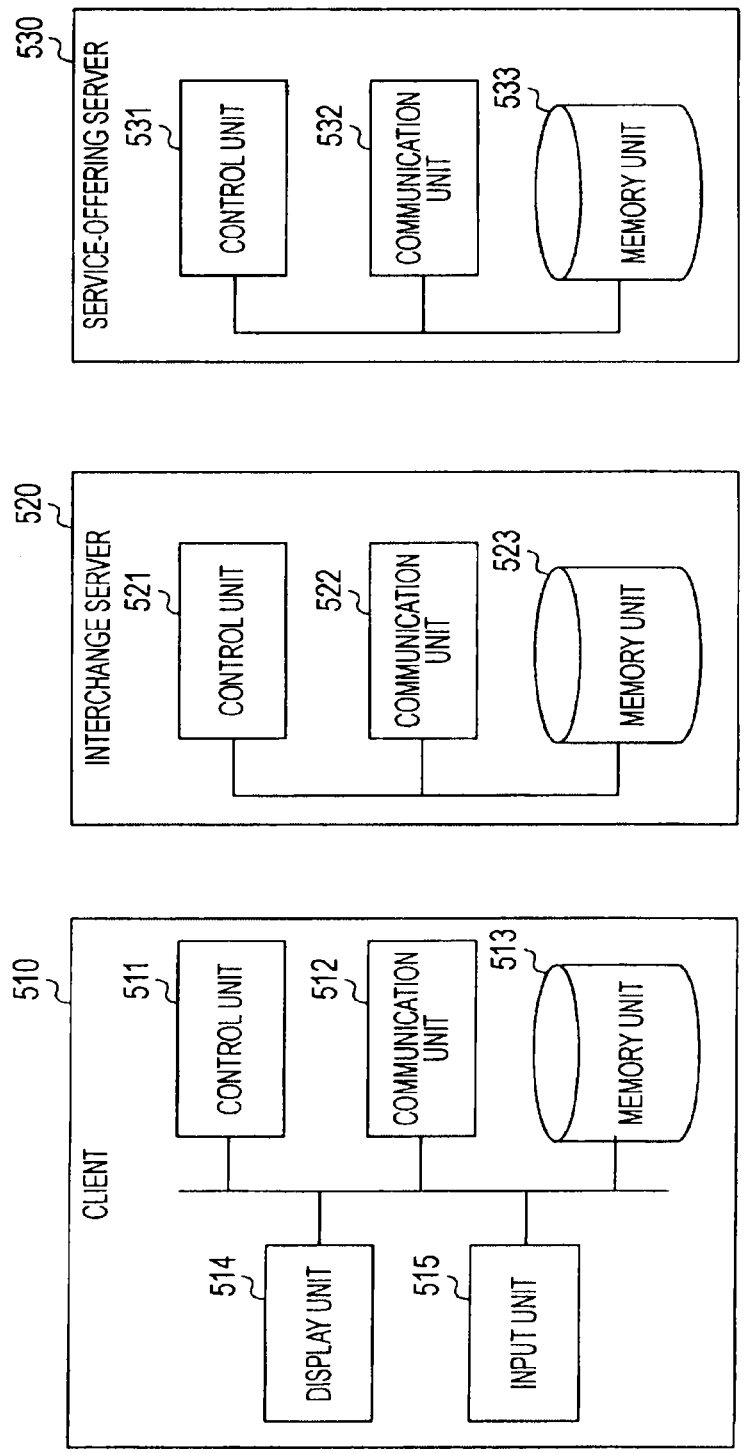

CLIENT DEVICE, INFORMATION PROCESSING SYSTEM AND ASSOCIATED METHODOLOGY OF ACCESSING NETWORKED SERVICES

CROSS-REFERENCE TO RELATED APPLICATIONS

The present application is a continuation application of U.S. application Ser. No. 12/995,619 filed Dec. 1, 2010, which is a National Phase of PCT/US09/51840 filed Jul. 27, 2009, and claims the benefit of U.S. application Ser. No. 61/137,241 entitled "Media Interchange", filed Jul. 28, 2008, and U.S. application Ser. No. 61/086,235 entitled "System of Uploading and Downloading Images by Using an Interchange Server," filed Aug. 5, 2008, the entire contents of each of which are incorporated herein by reference.

TECHNICAL FIELD

The present advancements relate to a client device, such as a camera, to access services offered by service-offering servers managed by service providers. For example, upload processing may be provided in which a client device transmits user data such as image data and the like to a server so as to store the uploaded data in a server database.

BACKGROUND ART

Various types of services are accessible via a network. For example, a service that allows user data such as images captured by a digital camera or the like to be uploaded to a server for storage in a database that is managed by the server is known. A user may browse the images that are stored in the database of the server on demand. In addition, the uploaded images can be made publicly accessible via a network, depending on user preferences. Such an image upload processing is described in, for example, Japanese Unexamined Patent Application Publication No. 2006-252152, incorporated herein by reference.

The types and modes of services offered differ from one service provider to another. A user can choose any service depending on their preference.

Service providers offering such an image upload service provide an individual solution for uploading an image(s) via Internet browser, that is, a solution unique to each individual service provider. For example, a client device can perform upload processing by means of the Internet browser. However, generally speaking, this processing is difficult because there are many restrictions unique to the Internet browser.

In order to improve usability, some mobile devices such as some digital cameras have, for example, an upload processing execution program that has been stored in a memory thereof in advance to be used for uploading a photographed image. Or, as another example, such a program is downloaded from a server and then stored in the memory of a mobile device such as a camera. Upload processing is performed with the use of the stored upload-dedicated program.

However, many of such upload processing programs are unique to respective service providers. That is, in order to use an image upload service that is offered by a certain service provider, a dedicated program that is unique to the above-mentioned certain service provider is necessary.

When a dedicated program that uniquely corresponds to a certain service provider is used in a client device such as a digital camera, the client uses an API (Application Programming Interface) that is unique to the service provider. The API is the unit of a program for the execution of predetermined processing. As a certain API is called up, predetermined processing that is specified in the called API is performed. For example, an API is set so as to correspond to each of server connection processing, login processing, upload processing, and the like. A client can execute a series of processing with the use of these APIs.

In the majority of cases, such API is unique to each service provider. That is, a dedicated API that corresponds to login processing, upload processing, or the like that is specified by each service provider is set. Accordingly, a client is required to use such a dedicated API.

As explained above, a service provider that offers an image upload service sets a plurality of APIs that are unique to services of its own. The service provider allows a client to use these APIs so as to perform upload processing. Through API application processing explained above, upload processing such as the creation of upload data that is in conformity with an acceptable data format that is unique to the service provider, client-server communication processing, and the like is executed. By this means, upload processing that is free from errors is ensured.

If a client uses services offered by one service provider only, it is enough to install a program/API that uniquely corresponds to the above-mentioned one service provider at the client side. However, in a practical sense, there are many service providers who offer image upload services. Therefore, in order to allow a user to freely select a service provider among them, it is necessary to install many programs/APIs, which respectively correspond to all service providers, on the client. This is not desirable for a client device such as a camera that has a limited memory space.

In addition, programs/APIs are subject to change and/or update due to, for example, change in the modes of services offered by service providers. If such change and/or update is effected after a client device in which a plurality of APIs and programs that corresponds to image upload services offered by a plurality of service providers is installed has been supplied to a user, it becomes necessary at the client side to update the programs/APIs. If a user is required to perform such updating processing, it places a burden on the user. Moreover, there is a risk of the occurrence of a processing error.

SUMMARY

In view of the foregoing, the present advancements provide client device, an information processing system, an information processing method, and a computer readable medium for accessing a plurality of service-offering servers via a common program and a common API.

The present disclosure provides a method of causing an interchange server to intermediate communication between a client device and a plurality of service-offering servers. A user interface is generated at the client device in accordance with a common API that is independent of the plurality of service-offering servers. Input data entered into the user interface is received at the interchange server. The input data includes selection of a service corresponding to at least one of the plurality of service-offering servers. The input data is translated according to at least one service-specific API associated with the at least one service-offering server corresponding to the selected service. The service-specific API is stored in an electronic memory of the interchange server as part of a plurality of different service-specific APIs that respectively correspond to the plurality of service-offering servers. The translated data is transmitted from the interchange server to the at least one service-offering server in accordance with the at least one service-specific API, and a response from the at least one service-offering server is translated and transmitted to the client in accordance with the common API.

Other objects, features, and advantages of the present disclosure will be fully understood from the following detailed description of exemplary embodiments of the invention read in conjunction with accompanying drawings.

BRIEF DESCRIPTION OF THE DRAWINGS

A more complete appreciation of the advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims.

FIG. 1 is a diagram of an information processing system according to an exemplary embodiment of the present disclosure;

FIG. 2 is a table of modes of services that are offered by service providers;

FIG. 3 is an additional table of modes of services that are offered by service providers;

FIG. 4 is a processing sequence diagram of a process executed between a client, an interchange server, and a service-offering server according to an exemplary embodiment of the present disclosure;

FIG. 5 is another processing sequence diagram of processing executed between a client, an interchange server, and a service-offering server according to an exemplary embodiment of the present disclosure;

FIG. 6 is a further processing sequence diagram of processing executed between a client, an interchange server, and a service-offering server according to an exemplary embodiment of the present disclosure;

FIG. 7 is a diagram of service detail information that is provided by the interchange server to the client according to an exemplary embodiment of the present disclosure;

FIG. 16 is a diagram of the hardware configurations for each of the client, the interchange server, and the service-offering server according to an exemplary embodiment of the present disclosure.

DETAILED DESCRIPTION

Figure 8:
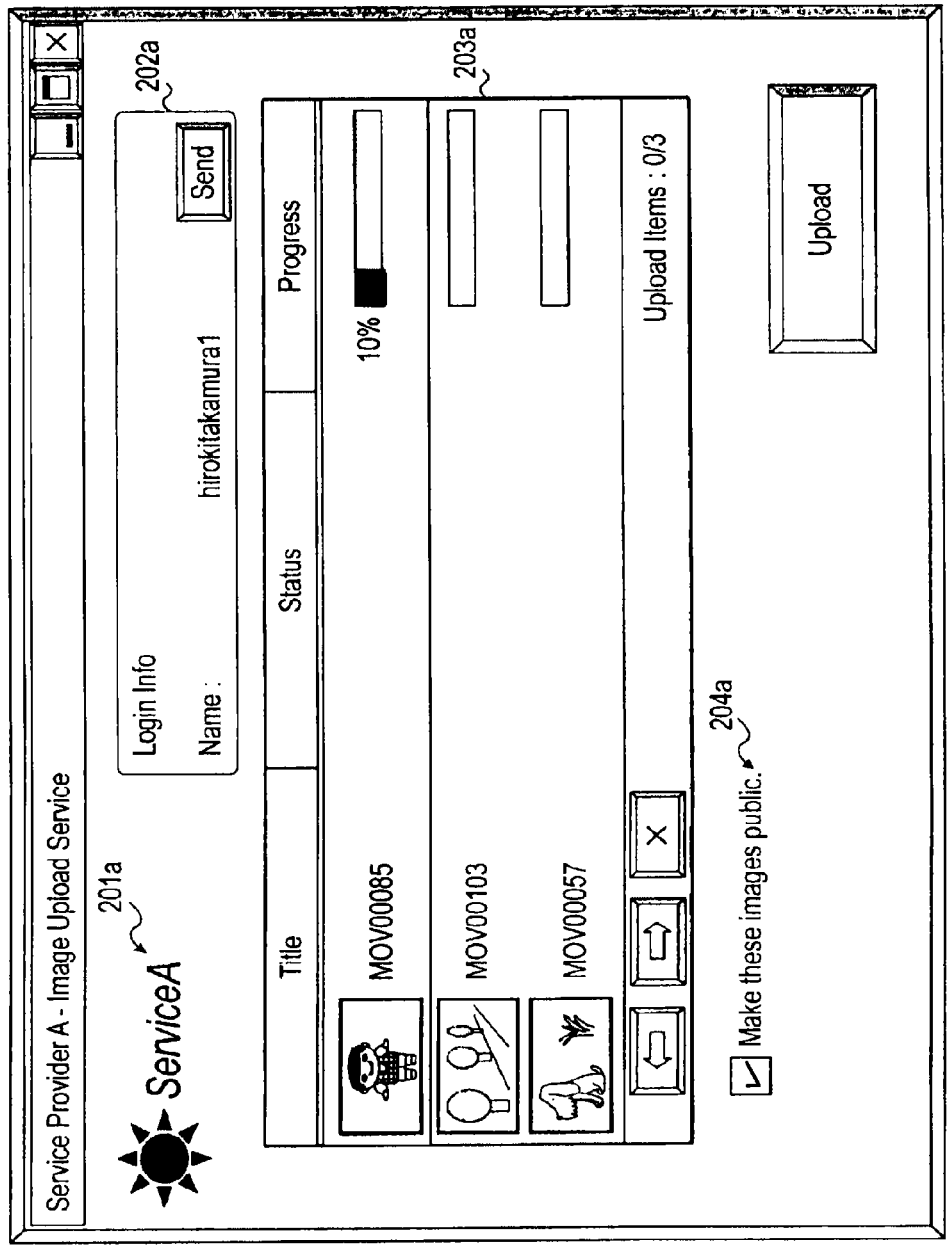
FIG. 8 is a diagram of a user interface (UI) for image upload processing, which is displayed on the display screen of the client, according to an exemplary embodiment of the present disclosure.

In the following, the present advancement will be discussed by describing a preferred embodiment, and by referring to the accompanying drawings. However, those skilled in the art will realize other applications and modifications within the scope of the invention as defined in the enclosed independent claims.

FIG. 1 is an example of the configuration of an information processing system according to an exemplary embodiment of the invention that includes a client 101, another client 102, a Web server 105, an interchange server 110, and service-offering servers A-F, 121-126. These apparatuses are configured in such a manner that they can perform communication via a network.

The service-offering servers 121-126 are servers that are operated by service providers A-F who offer services to the clients 101 and 102. Specifically, for example, the service-offering servers 121-126 store image data, which is uploaded by a client, into a database and manages the stored data. Images that are uploaded by clients are managed on a client-by-client basis so that the images are available for browsing as demanded by the client user. In addition, depending on user setting, it is possible to make the images available for public access via a network.

Each of the service-offering servers 121-126 is a server that is operated by a service provider A-F that is different from others. Although these service providers A-F are the same as one another in that they offer an image upload service, modes of services offered thereby differ from one individual service provider to another.

FIGS. 2 and 3 are examples of services offered by the service providers A-F. In FIGS. 2-3 an "O" represents a service mode offered by a service-offering server, an "X" represents a service mode not offered by the service-offering server and a "–" represents a table entry that is not applicable to the service-offering server.

Although the services offered by the service providers A-F have a commonality in that each of them manages images that are uploaded by clients, specific modes of services offered thereby differ from one service provider to another, an example of which is shown in FIGS. 2 and 3.

The following describes the service modes included in FIGS. 2-3.

(1) The "Compatible Picture Format" indicates which one, or both, of the uploading of a still picture and the uploading of a moving picture is allowed under each service.

(2) The "Public/Non-public Setting" indicates whether it is possible to set an image that is uploaded by a client (user) as a publicly available image/non-public image or not under each service.

(3) The "Album Function" indicates whether it is possible to set an album as a unit of the management of images that are uploaded by a client or not under each service.

(4) The "Album Title Entry" indicates whether the inputting of a title for an album that is set for a group of images that are uploaded by a client is accepted or not under each service.

(5) The "Image Title Entry" indicates whether the titling of an image that is uploaded by a client is allowed or not under each service.

(6) The "Image Description Entry" indicates whether the inputting of an explanation text of an image that is uploaded by a client is allowed or not under each service.

(7) The "Tag Entry" indicates whether the affixing of a tag to an image that is uploaded by a client is allowed or not under each service.

(8) The "Log-in Parameter" indicates the type of a login parameter that is required by each service A-F at the time of the execution of uploading from a client.

(9) The "Still Picture Maximum Size" indicates the maximum size of a still image that can be uploaded, that is, the uploading thereof is allowed, under each service.

(10) The "Moving Picture Maximum Size" indicates the maximum size of a moving image that can be uploaded, that is, the uploading thereof is allowed, under each service.

(11) The "Moving Picture Maximum Time" indicates the maximum length of time for a moving image that can be uploaded, that is, the uploading thereof is allowed, under each service.

(12) The "Maximum Content Number" indicates the maximum number of content that can be uploaded, that is, the uploading thereof is allowed, under each service.

(13) The "Service Logo" indicates the service logo of each service.

(14) The "Service Trademark Credit Line" indicates the text of the trademark credit of each service.

(15) The "Upload Order" indicates the sequential order of the arrangement of images that are uploaded by a client and then arranged at the time of and/or for browsing under each service.

(16) The "Server-side Automatic Processing" indicates processing which a server automatically performs at the time of upload processing under each service.

As will be understood from FIGS. 2 and 3, although the services offered by the service providers A-F have a commonality in that each of them manages images that are uploaded by clients, specific modes of services offered thereby differ from one service provider to another. It should be noted that FIGS. 2 and 3 are merely exemplary, and other modes of services are possible. As such, the present advancement is not limited in any way by the modes of service included in FIGS. 2-3.

Each of the service providers A-F corresponding to service-offering servers 121-126 of FIG. 1 offers, to clients, an image upload service that is unique as explained above. Therefore, it is typical that the service provider A-F provides a program/API that is required for upload processing to clients. Clients can perform upload processing while using the program/API that is provided by the service provider 121-126.

However, as has already been explained above, if it is assumed that a client uses services that are offered by various service providers A-F it is necessary for the client to memorize all programs/APIs that are offered by these service providers A-F in its memory. In addition, for example, when the updating of a program or the addition of a new API occurs, it is necessary to respond thereto at the client side.

An information processing system according to the present advancement is provided with an interchange server 110 in order to reduce the burden of a client.

Each of the clients 101 and 102 does not perform direct communication with the service-offering server 121-126 but performs indirect communication therewith. That is, the client 101 communicates with the interchange server 110, whereas the client 102 communicates with the Web server 105.

The client 101 is a client that stores programs/APIs for the execution of upload processing in, for example, a memory unit, and executes processing while using them. When using a service offered by the service-offering server 121-126 of each service provider, the client 101 uses a common program/API, which is common to all of these service providers, so as to perform communication with the interchange server 110. That is, the client 101 executes the uploading of an image, the browsing of an image, or the like while utilizing the service-offering server 121-126 through the intermediary of the interchange server 110.

The client 102 is a client that does not have any program/API that is applied to upload processing. Although the client 102 does not directly communicate with the interchange server 110, the client 102 has a browsing function and performs the uploading of an image by means of a Web page, which is offered by the Web server 105. That is, the client 102 executes the uploading of an image, the browsing of an image, or the like while utilizing the service-offering server 121-126 through the intermediary of the Web server 105 and the interchange server 110.

The Web server 105 is located somewhere between the interchange server 110 and the client 102. On the basis of data that is offered by the interchange server 110, the Web server 105 creates a web page that is made up of HTML data. Then, the Web server 105 provides the created web page to the client 102. In addition, the Web server 105 transfers data that is sent from the client 102 to the interchange server 110. For example, the Web server 105 transfers upload data to the interchange server 110.

The client 101 performs processing with the use of a common program/API for communication with the interchange server 110 when any of services offered by the service-offering servers 121-126 is used. The same holds true for the Web server 105. Therefore, the Web server 105 has the same program execution function as that of the client 101.

Next, with reference to FIGS. 4-6, an explanation is given of a communication processing sequence that is executed, when a client uses a service that is offered by any of the service-offering servers 121-126, between the client and the service-offering server through the intermediary of an interchange server.

Each of FIGS. 4-6 shows a client-side user, a client, an interchange server, and a service-offering server in the order of appearance herein with the user being the leftmost one. Note that the client in FIGS. 4-6 corresponds to the client 101 of FIG. 1. The interchange server in FIGS. 4-6 corresponds to the interchange server 110 in FIG. 1. The service-offering server in FIGS. 4-6 corresponds to any one of the service-offering servers 121-126 in FIG. 1.

Each process sequence of FIGS. 4-6 is explained below.

First of all, in a step S11, a client user launches a client program that has been stored in a client in advance. The client program is a common program that is run for a service of any of the service-offering servers 121-126.

In a step S12, the client makes a request for "a list of currently available services" to the interchange server in accordance with the launched program. When the client submits such a request, the client may transmit client local area information and client language information as parameters in addition to the request. Note that the parameter transmission thereof can be performed as processing that is in accordance with user setting.

In a step S13, the interchange server returns the requested list of currently available services to the client. The interchange server has received information on latest services from the service-offering servers 121-126 shown in FIG. 1 in advance. The interchange server creates a service list that is in accordance with the pre-received information, and then provides the service list to the client. If the interchange server has received local area information and the language information from the client, the interchange server may perform the filtering of the service list on the basis of the received information. For example, if the local area of the client is Japan and the language of the client is Japanese, the interchange server provides a Japanese-version list to the client.

Moreover, the interchange server may create and/or update the service list periodically without input from the client device. For example, the interchange server may update the service list in response to notification of updated services by the service-offering servers, in response to discovery of new service-offering servers, and/or in response to the unavailability of service-offering servers whose services are included in the service list. As can be appreciated by one skilled in the art, the cases of service list update by the interchange server are merely exemplary, and other cases are possible without departing from the scope of the present disclosure.

In a step S14, the client displays the list of currently available services that has been received from the interchange server on a display screen as, for example, user interface (UI) information. The service list is a list that shows services offered by each service provider. The service list is a UI that is set in such a manner that a user can select any service. For example, the service list contains:

Service Provider A: Still Picture Upload Service, Browse Service

Service Provider B: Still Picture Upload Service, Browse Service

Service Provider C: Still Picture Upload Service, Browse Service

Service Provider D: Moving Picture Upload Service, Browse Service

Service Provider E: Moving Picture Upload Service, Browse Service

In a step S15, the client user selects a specific service from the service list, and then commands the execution of processing, for example, the uploading of an image.

In a step S16, the client makes a request for detailed information on the selected service (i.e., specified service) to the interchange server on the basis of the inputted user instructions.

In a step S17, the interchange server transmits the detailed information on the selected service to the client. As has already been explained above, the interchange server has received detailed information on latest services from the service-offering servers 121-126 shown in FIG. 1 in advance. The interchange server selects information that corresponds to the service selected by the user out of the pre-received latest service detail information, and then provides the selected information to the client.

Before transmitting the detailed information, the interchange server may validate the client request for detailed information. For example, the interchange server may store machine-specific information pertaining to the client, and may use the machine-specific information to validate the client request. Such machine-specific information include, without limitation, a device ID specific to the client and a client version ID. However, as can be appreciated by one skilled in the art, other machine-specific information is also possible, such as a serial number or MAC ID.

The machine-specific information is not transmitted from the client to the interchange server. Instead, it is stored in the interchange server beforehand. The client may then use the machine-specific information to generate a checksum that is appended to the request. The interchange server may then validate the request based on the appended checksum by using the machine-specific information. Once, the request is validated, the interchange server transmits the detailed information to the client.

FIG. 7 is an example of the service detail information that is provided by the interchange server to the client. In FIG. 7, the service detail information has, for example, an extensible markup language (XML) data format, but may also be provided in a Javascript object notation (JSON) format. Other formats for the detailed information, are also possible without departing from the scope of the present disclosure. As such the format of the detailed information in no way limits the scope of the present advancements.

The service detail information contains information that is used for the generation of a user interface (UI) that is displayed on the display screen of the client when image upload processing is executed. In addition, the service detail information contains information on the mode of an image that can be uploaded, for example, information as to which one of the uploading of a still picture and the uploading of a moving picture is allowed. The service detail information further contains information on the size of an image, for example, information on the size of a still picture or information on the size of a moving picture. The service detail information further contains information on parameters that are required at the time of and/or for login. If there is a plurality of images that should be uploaded, the service detail information further contains setting information on the sequential order of images that are to be uploaded. It should be noted that the service detail information illustrated in FIG. 7 is merely a simplified example. That is, FIG. 7 does not show all of the service detail information. One of ordinary skill in the are will readily appreciate that other service detail information is possible without departing from the scope of the present advancement.

The service detail information contains information on the modes of services that have already been explained above while referring to FIGS. 2 and 3. That is, the service detail information contains information on (1) Compatible Picture Format, (2) Public/Non-public Setting, (3) Album Function, (4) Album Title Entry, (5) Image Title Entry, (6) Image Description Entry, (7) Tag Entry, (8) Log-in Parameter, (9) Still Picture Maximum Size, (10) Moving Picture Maximum Size, (11) Moving Picture Maximum Time, (12) Maximum Content Number, (13) Service Logo, (14) Service Trademark Credit Line, (15) Upload Order, and (16) Server-side Automatic Processing.

In a step S18, a client displays a user interface (UI) that is used for performing image upload processing in accordance with the service detail information, which has been received from the interchange server, that is, the selected information that corresponds to the service selected by the user.

The user interface (UI) that is used for performing image upload processing differs from one service to another, that is, depending on the service selected by the user. That is, the user interface (UI) is generated in accordance with the service detail information that corresponds to the service provider, which was selected by the interchange server in accordance with the user-selected information and then sent to the client.

Figure 9:
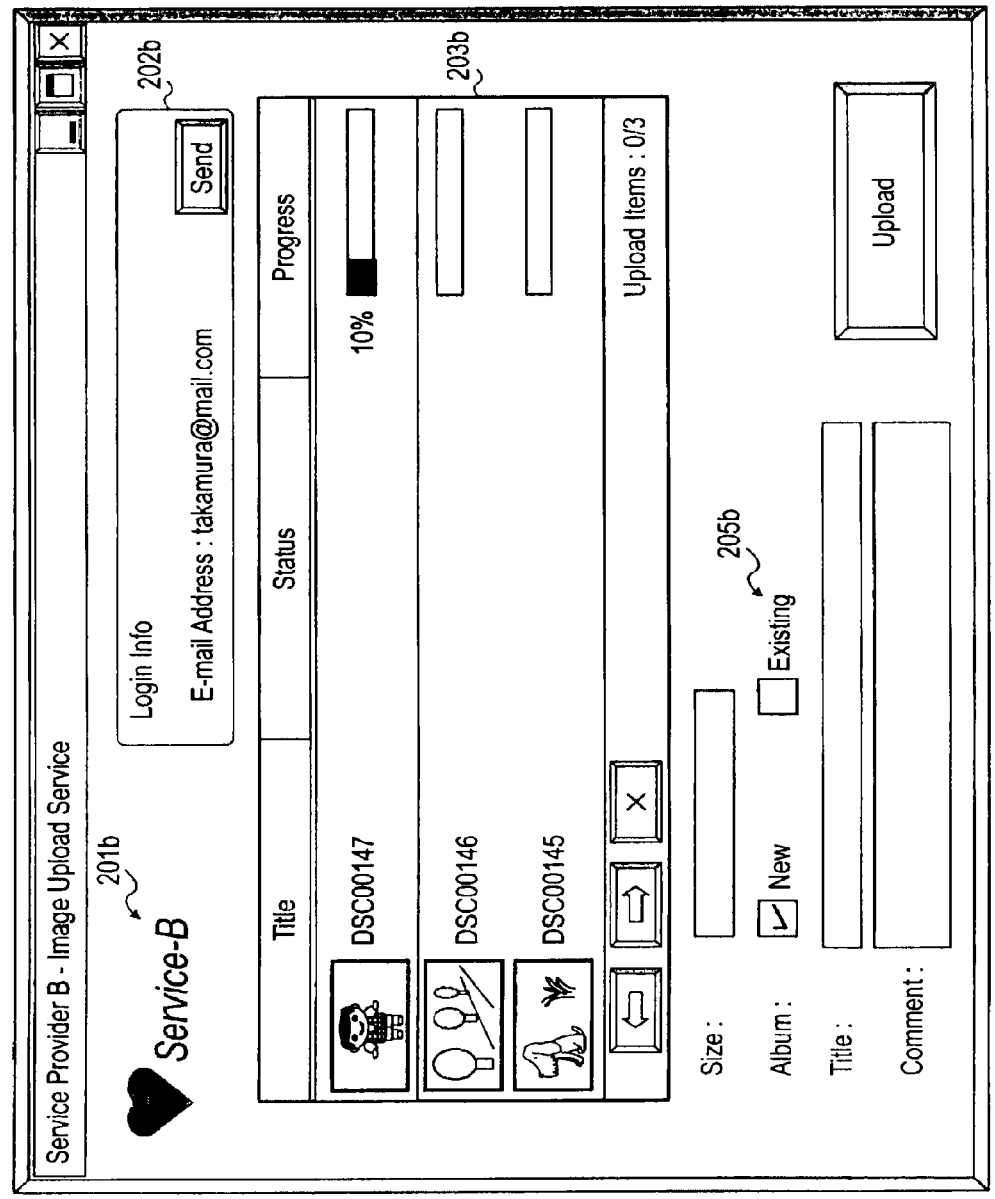
FIG. 9 is another diagram of a user interface (UI) for image upload processing, which is displayed on the display screen of the client, according to an exemplary embodiment of the present disclosure.

FIGS. 8 and 9 are examples of a user interface (UI) that is presented at the client. FIG. 8 is a user interface (UI) that is used for performing image upload processing and is generated in accordance with the service detail information corresponding to the service provider A. FIG. 9 is a user interface (UI) that is used for performing image upload processing and is generated in accordance with the service detail information corresponding to the service provider B.

In FIGS. 8 and 9, a user interface (UI) that is used for performing image upload processing contains, for example, the following display data:

(a) An icon/logo 201 of the service provider.

(b) A log-in information input box 202 that is used for inputting information that is necessary for login.

(c) An upload image setting box 203 that is used for setting an upload image(s).

(d) An upload image public/non-public checkbox 204 (shown for the service A of FIG. 8 only).

(e) Album information setting fields 205 that are provided for a service that offers an album function (shown for the service B of FIG. 9 only).

In addition thereto, various kinds of information are displayed as the UI depending on the service. As will be readily appreciated by one of ordinary skill in the art, other user interfaces are also possible without departing from the scope of the present advancement.

In addition, filtering processing may be performed so that, for example, any images that do not conform to the compatible picture format of the service are not displayed. Moreover, the display of a trademark credit line, notandums, that is, dos and don'ts for uploading, right/license information (EULA), and the like is performed. The display of these is performed on the basis of data that is contained in the service detail information that is provided by the interchange server to the client, which has already been explained above while referring to FIG. 7.

Referring back to the sequence charts of FIGS. 4-6, the communication sequence is further explained below. In the step S18 of FIG. 4, the user interface (UI) that is used for performing image upload processing, for example FIGS. 8 and 9, is presented on the display of the client.

Next, in a step S19 of FIG. 5, the user inputs login information (authentication information) in the login information input box of the presented user interface UI. The login information (authentication information) differs from one service provider to another. The user inputs the login information in accordance with input instructions shown on the UI. For example, if the user uses the service A that is offered by the service provider A shown in FIG. 8, the user inputs their user name as the login information (authentication information) as prompted in a log-in information input box 202a.

On the other hand, if the user uses the service B that is offered by the service provider B the user interface of FIG. 9 is used. Therein, the user inputs their e-mail address as the login information (authentication information) as prompted in a log-in information input box 202b.

In a step S20, the client transmits the login information (authentication information) to the interchange server.

In a step S21, the interchange server transmits the login information (authentication information) to one of the service-offering servers of the service providers A-F that has already been selected by the user. It should be noted that a program/API that is provided for the transmission of login information (authentication information) by the service provider that has already been selected by the user is used for this login information transmission processing.

Upon the reception of the login information (authentication information) from the interchange server, the service-offering server verifies the received login information (authentication information). Then, if it is verified that the user is a client user/person who has due upload authority, the service-offering server accepts a login request. In a step S22, the service-offering server returns a login verification result (Success) to the interchange server and establishes a communication connection for maintaining a session.

Next, in a step S23, the interchange server transfers the login verification result (Success) to the client and issues a session ID for maintaining a communication session between the client and the interchange server. Subsequent communication between the client and the interchange server is performed with the additional notation of the session ID as a parameter.

In a step S24, the user inputs information that is required for upload processing; for example, the user sets an upload image(s) and the like. In this step, the user inputs necessary information with the use of the user interface that is provided for image upload processing, a few examples of which have been explained earlier with reference to FIGS. 8 and 9. The user creates an album and inputs a title and/or a comment where necessary. Then, the user issues upload instructions.

In a step S25, in response to the upload instructions issued by the user, the client sends, that is, uploads, image data that includes an image(s) to be uploaded and meta data (e.g., comment) to the interchange server. If a plurality of images is uploaded, the sequential order of the uploading thereof is controlled in accordance with the service offered by the service provider that is selected by the user. Such control information is also contained in the service detail information that has already been explained above while referring to FIG. 7.

The reason why the sequential order of the uploading of a plurality of images is changed depending on the service that is selected by the user, that is, depending on the service provider selected thereby, is that the sequential order of the display of a plurality of uploaded images differs from one service provider to another. In other words, it is because the sequence format of an image list that is provided for the browsing of uploaded images varies from one service provider to another.

For example, some service providers offer a list for browsing images that are arranged in the order of the uploading thereof performed by a client. That is, they offer a browsing list that shows the earliest (i.e., first) uploaded image as the first one and later uploaded images as subsequent ones that are arranged in accordance with the sequential order of the uploading thereof.

Other service providers offer a list for browsing images that are arranged in a sequential order reverse to the order of the uploading thereof performed by a client. That is, they offer a browsing list that shows the latest (i.e., last) uploaded image as the first one and earlier uploaded images as subsequent ones that are arranged in accordance with an order reverse to the sequential order of the uploading thereof.

Figure 10:
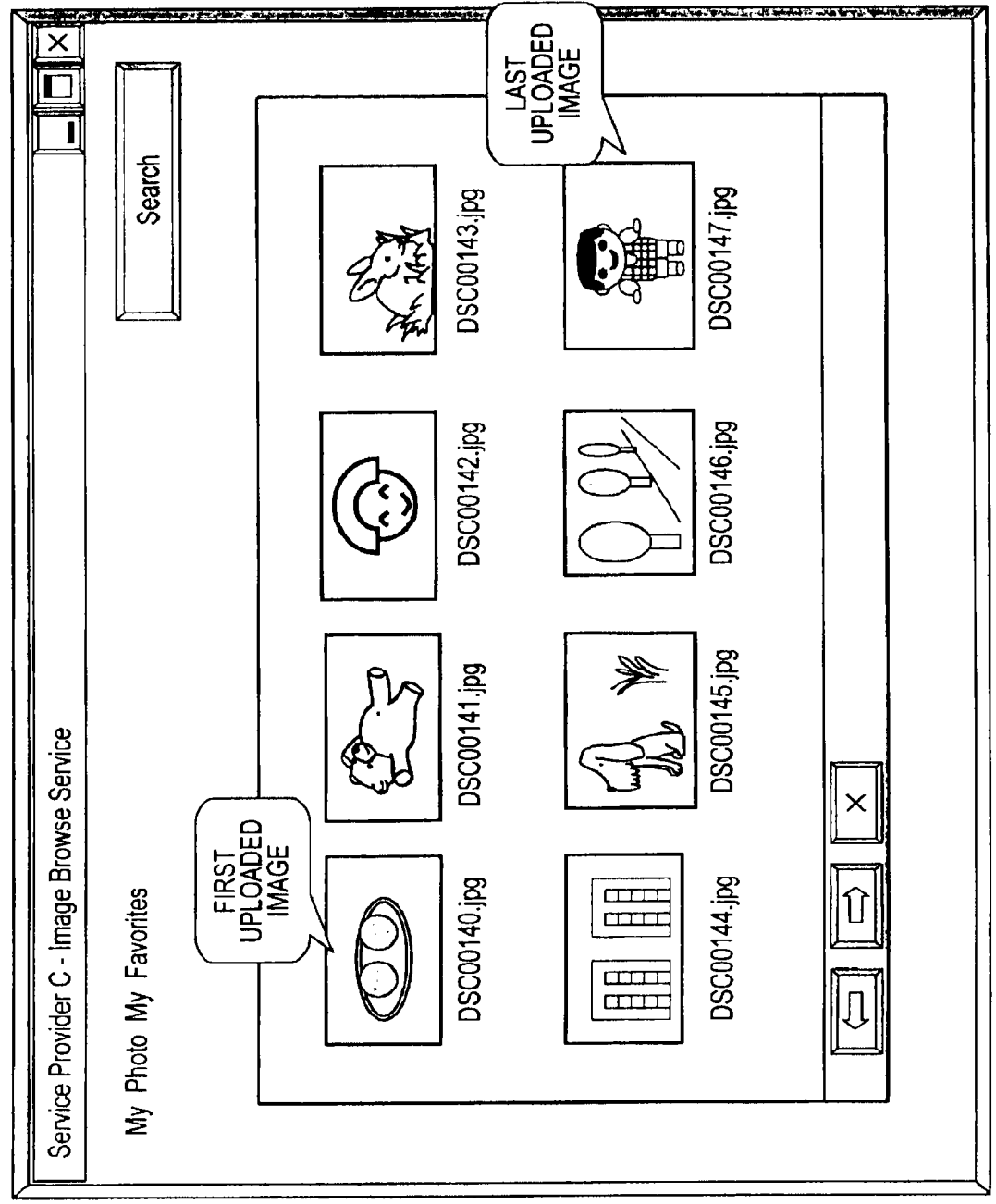
FIG. 10 is a diagram of an image list that is displayed on the display screen of the client at the time of the browsing of uploaded images according to an exemplary embodiment of the present disclosure.
Figure 11:
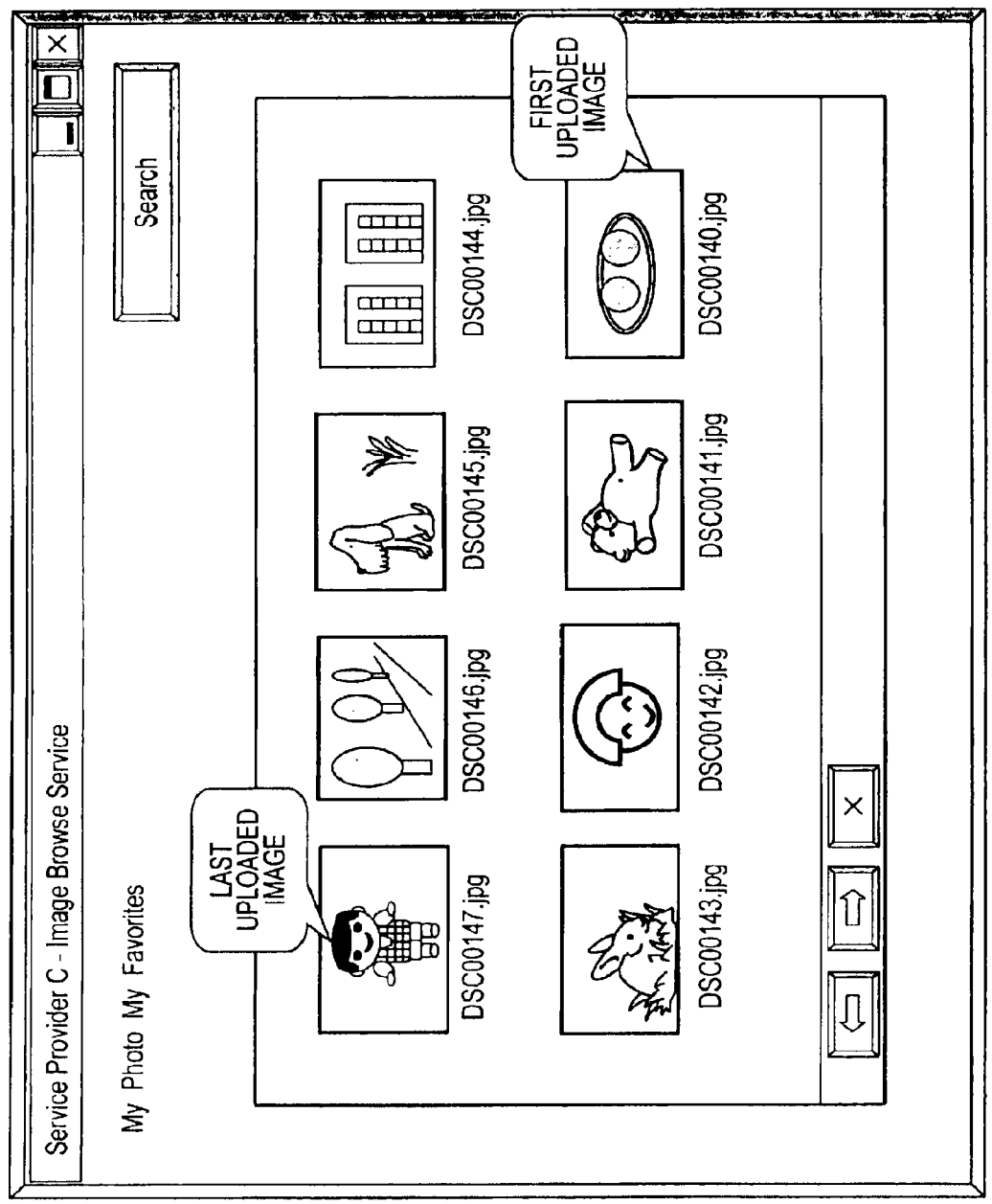
FIG. 11 is another diagram an image list that is displayed on the display screen of the client at the time of the browsing of uploaded images according to an exemplary embodiment of the present disclosure.

An example of such an image browse list is explained while referring to FIGS. 10 and 11. FIGS. 10 and 11 are lists for browsing uploaded images that are offered by two service providers different from each other.

FIG. 10 is a list for browsing images that are arranged in the sequential order of the uploading thereof performed by a client. That is, FIG. 10 is an image browse list that shows the first image uploaded by a client as the first one and later images uploaded by the client as subsequent ones that are arranged in accordance with the sequential order of the uploading thereof.

FIG. 11 is a list for browsing images that are arranged in an order reverse to the sequential order of the uploading thereof performed by a client. That is, FIG. 11 is an image browse list that shows the last image uploaded by a client as the first one and earlier images uploaded by the client as subsequent ones that are arranged in accordance with an order reverse to the sequential order of the uploading thereof.

If the arrangement of images contained in one image browse list that is offered to a client by one service provider differs from the arrangement of images contained in another image browse list that is offered to the client by another service provider, the client user who uses various kinds of services might be confused. In order to prevent users from being confused, the sequential order of uploading images is changed in such a manner that the arrangement of images contained in an image browse list is always the same, regardless of which service provider is selected.

That is, when a client uploads a plurality of images in a sequential manner, the sequential order thereof is controlled so as to ensure that the order of display offered at the time of image browsing is always the same, regardless of which service is selected.

For example, the display order of images in FIG. 10, that is, the order of a list for browsing images that are arranged in the sequential order of the uploading thereof by a client, is set as "normal order". The display order of images in FIG. 11, that is, the order of a list for browsing images that are arranged in an order reverse to the sequential order of the uploading thereof by the client, is set as "reverse order".

Under such a setting, if the service selected by the user is one that is offered by a service provider who offers a "reverse-order" browsing list, upload processing is performed after reversing the sequential order of a plurality of upload images when the client uploads these images.

On the other hand, if the service selected by the user is one that is offered by a service provider who offers a "normal-order" browsing list, upload processing is performed without reversing the sequential order of a plurality of upload images when the client uploads these images.

Since the sequential order of the uploading of images is controlled as explained above, it is possible to browse images that are presented in the form of a "normal-order" browsing list regardless of which service provider is selected.

In the foregoing upload processing example, although an explanation is given under the assumption that each of all services presents a "normal-order" image list, it is not necessarily limited thereto. That is, upload processing may be performed under the setting in which a "reverse-order" image list is presented in each of all services. Under such a modified setting, if the service selected by the user is one that is offered by a service provider who offers a "reverse-order" browsing list, upload processing is performed without reversing the sequential order of a plurality of upload images when the client uploads these images.

On the other hand, if the service selected by the user is one that is offered by a service provider who offers a "normal-order" browsing list, upload processing is performed after reversing the sequential order of a plurality of upload images when the client uploads these images.

Since the sequential order of the uploading of images is controlled as explained above, it is possible to browse images that are presented in the form of a "reverse-order" browsing list regardless of which service provider is selected.

As explained above, when a plurality of images is uploaded in the image-uploading step S25 of FIG. 5, control is executed so as to change the sequential order of the transmission of the images depending on the service selected by the user.

Next, in a step S26, the interchange server temporarily stores the image data that has been received from the client into a memory. Then, the interchange server uploads the image data to the service-offering server that is selected by the user.

It should be noted that a program/API that is provided for upload processing by the service provider that has already been selected by the user is used for this upload processing.

In this upload processing, the interchange server adds information and/or corrects information where necessary. For example, the interchange server processes transmission information by affixing meta data (title, comment, and/or tag) to an image.

Specifically, for example, if data that has been transmitted from the client to the interchange server does not satisfy upload format conditions that are required by the service provider, the interchange server performs the processing of the data for uploading so as to meet the required conditions.

For example, in some cases, the number of characters contained in a comment that is attached to an image that is included in upload data transmitted from a client to the interchange server may not be in agreement with the acceptable number of characters for the selected service provider. As another example, required meta data that is not allowed to be omitted may not be affixed to an image. In such a case, the interchange server performs the addition of information and/or correction thereof to arrange the format thereof so as to ensure that that no uploading error occurs.

Next, in a step S27, the interchange server transmits upload data (e.g., image(s), meta data, and the like) that contains an image(s) that has been received from the client to the service-offering server selected by the user.

The service-offering server receives the upload data from the interchange server. Then, the service-offering server keeps and manages the received upload data under the data management policy thereof.

Next, in a step S28 of FIG. 6, the service-offering server returns the result of upload (e.g., Success/Failure) to the interchange server. The service-offering server may return, as the uploading result, a URL(s) that is set for the uploaded image(s) as information for accessing the uploaded image(s) to the interchange server.

In a step S29, the interchange server transmits the result of upload together with URL information corresponding to the uploaded image(s), which have been received from the service-offering server, to the client.

Upon the reception of the URLs corresponding to the uploaded images from the service provider, the interchange server may transfer the URLs corresponding to the uploaded images to the client without performing any processing thereon. Or, for example, in the flowchart of FIG. 12, the interchange server may select one URL out of the URLs corresponding to the uploaded images and then send the selected URL to the client.

Figure 12:
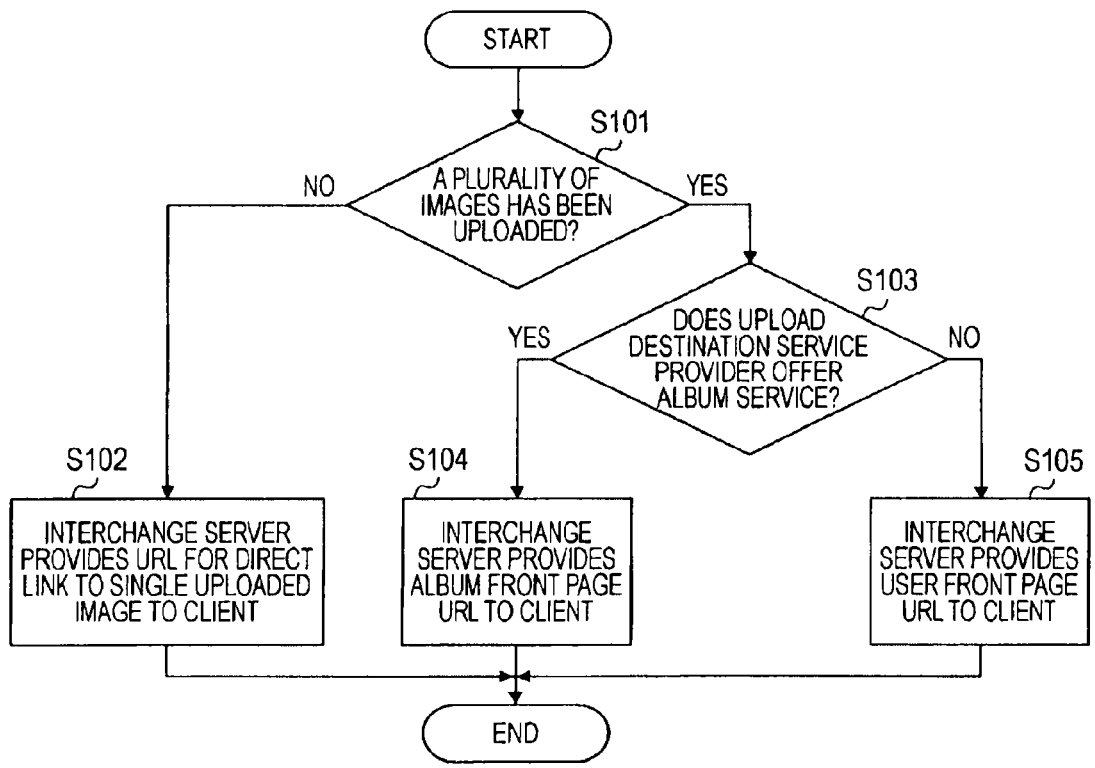
FIG. 12 is a flowchart of a URL selection processing sequence for selecting a URL corresponding to upload image(s) that is provided by the interchange server to the client according to an exemplary embodiment of the present disclosure.

The operation flow of FIG. 12 includes procedures for selecting one URL that should be provided to the client where the selection is made depending on the actual mode of upload taken by the client out of the following three upload modes.

When a client has uploaded a single image, the interchange server provides a URL for direct link to the uploaded image to the client. When a client has uploaded a plurality of images to a service-offering server that offers an album function, the interchange server provides the URL of the front page of an album to the client. When a client has uploaded a plurality of images to a service-offering server that does not offer an album function, the interchange server provides the URL of the front page of the user to the client.

The flowchart of FIG. 12 is explained below. First of all, in a step S101, the interchange server makes a judgment as to whether the client has uploaded a plurality of images or not.

If it is judged in the step S101 that the client has uploaded a single image, the process moves on to a step S102. In the step S102, the interchange server provides a URL for direct link to the single uploaded image to the client.

If it is judged in the step S101 that the client has uploaded a plurality of images, the process moves on to a step S103. In the step S103, the interchange server judges whether the upload destination service provider offers an album service or not. That is, the interchange server confirms whether the upload destination service provider offers a service for managing a group of a plurality of images uploaded in a batch transmission as an album or not.

If it is judged in the step S103 that the upload destination service provider offers an album management service, the process goes to a step S104. In the step S104, the interchange server provides the URL of an album front page to the client.

On the other hand, if it is judged in the step S103 that the upload destination service provider does not offer an album management service, the process goes to a step S105. In the step S105, the interchange server provides the URL of a user front page to the client.

As explained above, the interchange server selects one URL and then provides the selected URL to the client. If such URL selection processing is performed, it is possible for the user to browse images in an efficient manner while utilizing the optimally selected URL. The interchange server executes the URL selection processing explained above as procedures common to all service providers.

Referring back to FIG. 6, the entire sequence is further explained below. In the step S29, the interchange server transmits the result of upload together with URL information corresponding to the uploaded image(s), which have been received from the service-offering server, to the client.

Finally, in the step S30, the client displays the result of the upload and the URL(s) on the display screen and then terminates the processing. The URL(s) is stored in the memory unit (nonvolatile memory) of the client. The stored URL is used at the time of the execution of browsing processing.

In the foregoing description, it is assumed that the sequence explained above while referring to FIGS. 4-6 is performed as communication processing between the client 101 and the service-offering server 121-126 through the intermediary of the interchange server 110 of FIG. 1.

If the sequence is performed as processing between the client 102 and the service-offering server 121-126 through the intermediary of the Web server 105 and the interchange server 110 of FIG. 1, the processing between the interchange server 110 and the service-offering server 121-126 is performed as the same processing as that performed between the interchange server and the service-offering server that is explained above with reference to FIGS. 4-6.

In addition, the processing between the interchange server 110 and the Web server 105 is performed in the same manner as performed between the interchange server and the client that is explained above with reference to FIGS. 4-6. The processing between the client and the user that is explained above with reference to FIGS. 4-6 is performed as the processing between the Web server 105, the client 102, and the user.

The Web server 105 creates a web page in an HTML data format in accordance with the data that has been received from the interchange server 110. Then, the Web server 105 presents the created web page to the client 102. The client 102 uses its browser function to display the web page provided by the Web server 105.

The user uses the web page that is displayed on the client 102 as user interface and performs the inputting of data, the setting of an upload image(s), and the like. Then, the user transmits data including the upload image(s) with the use of the web page to the Web server 105. As done by the client A, the Web server 105 uses a common program/API, which is common to all service providers, so as to perform communication with the interchange server 110. By this means, the Web server 105 transmits upload information that has been received from the client 102 to the interchange server 110.

Through such processing, the client 102, which is a client that does not have any program/API that is applied to upload processing, can execute the same image upload processing as that of the client 101.

As explained above, when a service offered by any of the service-offering servers 121-126 is used, it is not necessary for the clients 101 and 102 to switch to a program/API that is uniquely applied to the selected service. This is thanks to the intermediary of the interchange server.

When any service offered by the service-offering servers 121-126 is used, each of the client 101 and the Web server 105 can use a common program/API for communications with the interchange server.

An example of the application of APIs is explained below while referring to FIGS. 13-15. Each of FIGS. 13-15 includes a client, an interchange server, and a service-offering server in the order of appearance herein as viewed from left to right. The client of FIGS. 13-15 corresponds to the client 101 of FIG. 1, or the Web server 102 that performs communication with the client 102 of FIG. 1. The interchange server shown therein corresponds to the interchange server 110 of FIG. 1. The service-offering server shown therein corresponds to any of the service-offering servers 121-126 of FIG. 1.

Figure 13:
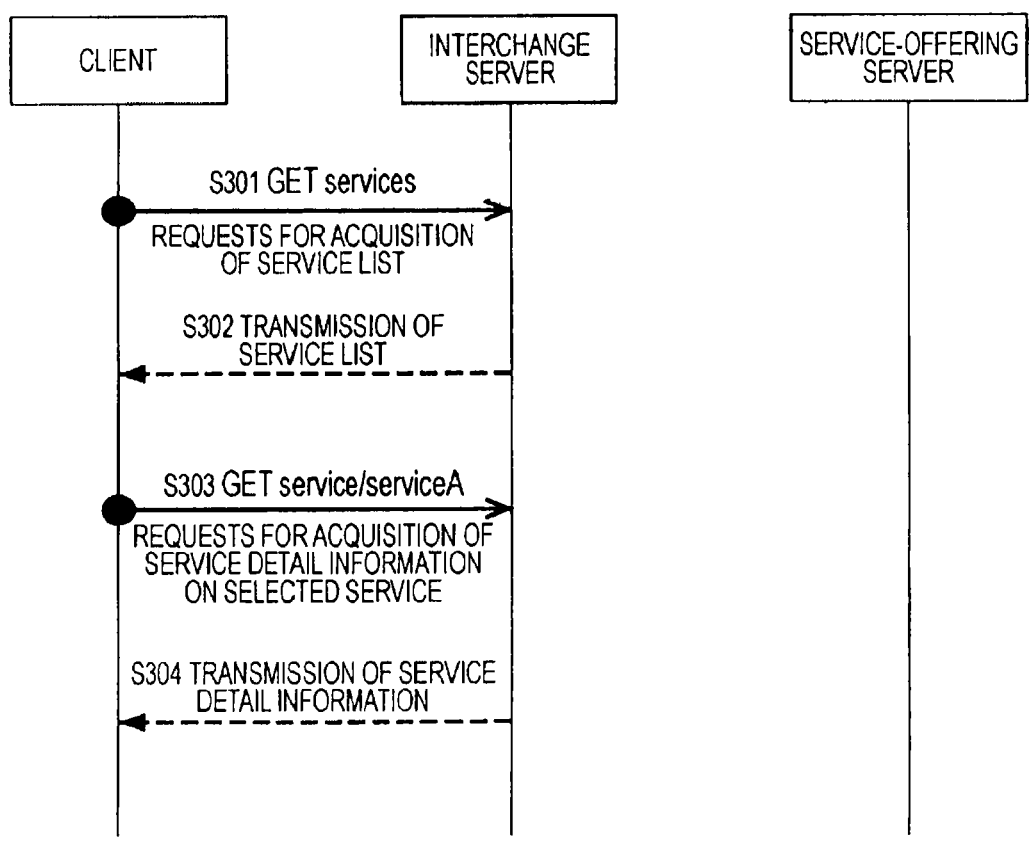
FIG. 13 is a sequence chart of APIs that are applied to processing between the client, the interchange server, and the service-offering server according to an exemplary embodiment of the present disclosure.
Figure 14:
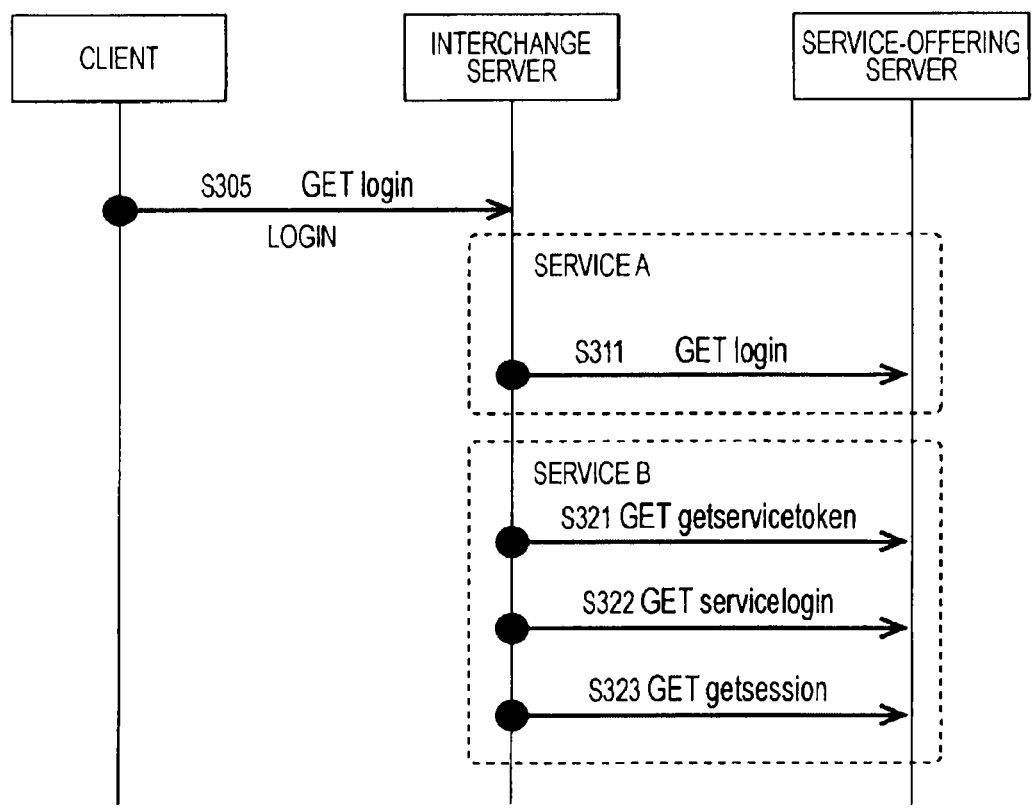
FIG. 14 is another sequence chart of APIs that are applied to processing between the client, the interchange server, and the service-offering server according to an exemplary embodiment of the present disclosure.
Figure 15:
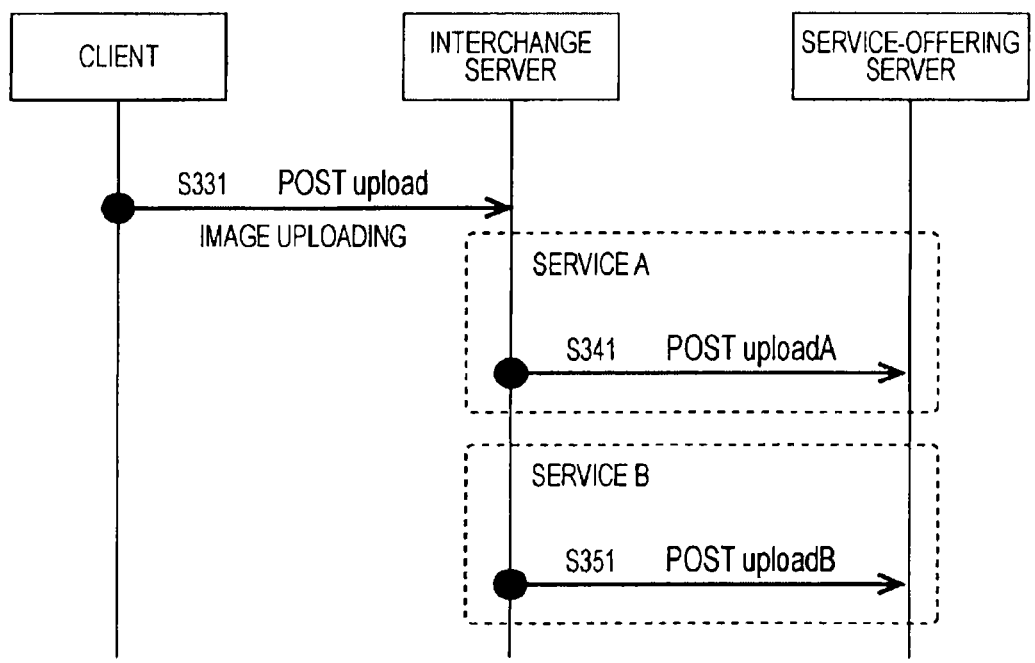
FIG. 15 is a further sequence chart of APIs that are applied to processing between the client, the interchange server, and the service-offering server according to an exemplary embodiment of the present disclosure.

A set of sequence charts of FIGS. 13-15 include the sequence of the uploading of an image(s) by the client to the service-offering server through the intermediary of the interchange server as has already been explained above while referring to FIGS. 4-6. The sequence charts of FIGS. 13-15 are an example of an API that is used by the client (or Web server) and an API that is used by the interchange server.

When any service that is offered by the service-offering servers 121-126 of FIG. 1 is used, the client can use an API that is common thereto (i.e., common API). Upon the selection of one service at the client side, the selected service is notified to the interchange server. Accordingly, it should be noted that, once one service has been determined at the client side, the interchange server uses an API that corresponds to the service selected by the client so as to perform communication/processing with the service-offering server that offers the selected service.

First of all, in a step S301, the client uses (i.e, applies) a common API [GET services] so as to make a request for the acquisition of a service list. The API [GET services] is an API that causes a program that defines a sequence for making a request for a service list to the interchange server to be executed. In a step S302, the interchange server transmits a service list to the client in response to the request issued from the client.

Next, in a step S303, the client uses a common API [GET service] so as to make a request for the acquisition of service detail information. The API [GET service] is an API that causes a program that defines a sequence for making a request for service detail information to the interchange server to be executed. Note that the client transmits the identifier of the selected service to the interchange server when making a request for service detail information to the interchange server.

In a step S304, in response to the request made by the client, the interchange server sends service detail information that corresponds to the service selected by the client. The service detail information is, for example, information that has been explained earlier while referring to FIG. 7.

Next, in a step S305 of FIG. 14, the client inputs login information in the login information input box 202 of a user interface (UI) (refer to FIGS. 8 and 9) that is displayed on a display screen so as to be used for performing image upload processing on the basis of the service detail information. In this way, login processing is performed in the step S305. The API used for login processing is a common API [GET login] in step S305 of FIG. 14. The API [GET login] is an API that causes a program that defines a sequence for transmitting login information to the interchange server to be executed.

In response to the inputting of login information by the client, the interchange server performs login to the service-offering server that corresponds to the service selected by the client. An API that is provided by the service provider that corresponds to the service selected by the client is used for this login processing. That is, it is executed as login processing that corresponds to a sequence that is unique to the selected service provider.

In FIG. 14, at step S311, processing is performed in a case where the client has selected the service A, whereas at steps S321-S323, processing is performed in a case where the client has selected the service B. For example, the processing of the step S311 is executed for log in to the service-offering server A, which offers the service A. A unique API [GET login] that is supplied from the service provider A, which manages the service-offering server A, is applied to this login processing. The interchange server has been set in advance in such a manner that it can use all APIs that are supplied from all service providers. Having been preset as above, the interchange server selects one API that should be applied on the basis of the service selection information that is sent from the client and then uses the selected API.

If the client has selected the service B, the steps S321-S323 are executed for login to the service-offering server B. In order to log in to the service-offering server B, which offers the service B, three APIs that are unique to the service B are used. More specifically, [GET getservicetoken], [GET servicelogin], and [GET getsession] are used for log in to the service-offering server B. Processing for log in to the service-offering server B is executed with the application of these three APIs.

If the client executed login directly to the service-offering server B, which offers the service B, it would be necessary for the client to use these three APIs, unlike the configuration according to the present embodiment of the invention. In this respect, however, since the interchange server executes service login to the selected service in place of the client in the configuration according to the present embodiment of the invention, it is possible for the client to always use a common API (step S305) irrespective of which service is used.

FIG. 15 is an example of the application of APIs for image upload processing. The client sets an image(s) to be uploaded in the upload image setting box 203 of the user interface (UI) (refer to FIGS. 8 and 9) that is displayed on the display screen so as to be used for performing image upload processing. In addition, the client enters data in each data input field of the user interface (UI) and, after the inputting of data, depresses the upload button. Through the uploading manipulation explained above, a common API [POST upload] is executed. This API is also a common API, which is common to all services.

The common API [POST upload] is an API that is used for transmitting upload image(s) and inputted data that are set in the upload image setting box 203 of the image-uploading user interface (UI) (refer to FIGS. 8 and 9) to the interchange server.

Upon the reception of the upload data from the client, as done in the login processing explained above, the interchange server uses an API that is provided by the service provider that corresponds to the service specified by the client so as to execute image upload processing. That is, the interchange server executes image upload processing that corresponds to a sequence that is unique to the selected service provider.

In FIG. 15, at step S341, processing is performed in a case where the client has selected the service A, whereas at step S351 processing is performed in a case where the client has selected the service B. For example, the processing of the step S341 is executed for uploading an image(s) to the service-offering server A, which offers the service A. A unique API [POST upload A] that is supplied from the service provider A, which manages the service-offering server A, is applied to this image upload processing.

The processing of the step S351 is executed for uploading an image(s) to the service-offering server B, which offers the service B. A unique API [POST upload B] that is supplied from the service provider B, which manages the service-offering server B, is applied to this image upload processing.

As explained above, in the configuration according to the present embodiment of the invention, the interchange server performs processing while using an API that corresponds to the service-offering server so as to perform processing in accordance with a sequence that is unique to the service-offering server. In contrast, it is possible for the client to perform processing while using a common API, which is common to all service-offering servers, irrespective of which service is used.

In addition, in a case where a program/API is updated at the service-offering server, the interchange server acquires the updated program/API and uses thereof, which makes it unnecessary for the client to perform any updating processing for the program/API. Thus, the burden of the client is substantially reduced.

As has already been explained above, the client that performs processing with the use of the common API of FIGS. 13-15 is not limited to the client 101 of FIG. 1. That is, the Web server 105 also performs processing with the use of the common API.

With reference to FIG. 16, an example of the hardware configuration of each of a client, an interchange server, and a service-offering server is explained below.

In FIG. 16, the client 510 is provided with a control unit 511 that performs data processing while using various programs/APIs, a communication unit 512 that performs communication via a network, a memory unit 513 that memorizes programs, APIs, parameters, image data, and the like, a display unit 514 that displays, for example, an image and a user interface, and an input unit 515 that inputs user manipulation information. The display unit may function also as the input unit if, for example, the client 510 has a configuration that accepts an input via UI. An example of such a configuration is a touch panel UI.

As has already been explained in the foregoing exemplary embodiment of the present advancement, the control unit 511 of the client 510 selectively applies a plurality of APIs (Application Programming Interface) that define execution processing and performs communication with a service-offering server through the intermediary of an interchange server so as to use a service that is offered by the service-offering server. When using any service among a plurality of services different from one another, which are offered by a plurality of service-offering servers, the control unit 511 performs processing with the use of a common API.

When performing processing for the use of a service, for example, the control unit 511 uses the common API so as to transmit service selection information to the interchange server and receives service detail information corresponding to the selected service from the interchange server; the control unit 511 uses user interface generation information that is contained in the received service detail information so as to display a user interface; and the control unit 511 uses the common API so as to transmit information that is inputted via the user interface to the interchange server.

As has been explained earlier while referring to FIGS. 13-15, the common API includes a login processing execution API, which defines login functions that should be executed for using a service that is offered by the service-offering server. When using the service-offering server, the control unit 511 uses, after that login information defined in a user interface generated on the basis of the service detail information has been inputted, the login functions so as to transmit the login information to the interchange server. The interchange server uses the login information that is received from the client so as to execute a login processing sequence that is unique to the service-offering server that corresponds to the service selected by the client.

In addition, the common API includes an image upload function that is to be used for executing image upload processing, which is a service that is offered by the service-offering server. When using the service-offering server, the control unit 511 uses, after that data has been inputted in an upload image setting portion defined in a user interface generated on the basis of the service detail information, the image upload function so as to transmit upload information to the interchange server. The interchange server uses the upload information that is received from the client so as to execute an upload processing sequence that is unique to the service-offering server that corresponds to the service selected by the client.

As has already been explained above, the service detail information includes upload sequential order prescription information that prescribes upload sequential order for uploading a plurality of images to the service-offering server. When a plurality of images is to be uploaded to the service-offering server, the control unit 511 performs image upload processing in accordance with the upload sequential order prescription information.

Other functions are also included in the common API. For example, an albums function is included to determine a listing of client albums on a service-offering server to which the client is logged in. A new album function may be used to create new client albums on the service-offering server. Further, an image function may be used to display at the client images stored on the service-offering server, and an assets function may be used to determine client assets stored on the service-offering server. Client assets including, for example, photos, videos, audio files and other media. As will be appreciated by one skilled in the art other functions are also possible without departing from the scope of the present disclosure.

In FIG. 16, the interchange server 520 is provided with a control unit 521 that performs data processing while using various programs/APIs, a communication unit 522 that performs communication via a network, and a memory unit 523 that memorizes programs, APIs, parameters, image data, and the like.

The control unit 521 of the interchange server 520 provides service detail information corresponding to a service selected by a client to the client on the basis of service selection information that has been received from the client. Then, the control unit 521 of the interchange server 520 receives data that has been inputted via a user interface generated on the basis of the service detail information from the client, and then transfers the received data to the service-offering server that corresponds to the selected service.

Moreover, as has been explained earlier while referring to FIGS. 13-15, the control unit 521 uses a unique API, which is unique to the service-offering server that offers the service selected by the client, so as to execute a login processing sequence that is unique to the service-offering server or an upload processing sequence that is unique to the service-offering server upon the reception of login information or upload data from the client.

Furthermore, the control unit 521 of the interchange server 520 receives URLs from the service-offering server as information for accessing the data uploaded from the client, and performs URL selection processing so as to select a URL that should be transmitted to the client on the basis of the upload data or the modes of service offered by the service-offering server. This is the selection processing that has already been explained above while referring to the flowchart of FIG. 12.

The service-offering server 530 is provided with a control unit 531 that performs data processing while using various programs/APIs, a communication unit 532 that performs communication via a network, and a memory unit 533 that memorizes programs, APIs, parameters, image data, and the like.

Note that a Web server has, basically, the same configuration as that of the client 510 shown in FIG. 16 except that the Web server is not provided with the display unit and the input unit of the client 510. Each of the clients 101 and 102 has fundamentally the same configuration as that of the client 510 shown in FIG. 16 except that the program/API execution function of the client 102 is inferior to that of the client 101. Despite the fact that the program/API execution function of the client 102 is inferior to that of the client 101, since the client B is provided with a browsing function, the client 102 can perform image upload processing and browsing processing just in the same manner as done by the client 101 by displaying a web page that is presented by the Web server.

A series of processing that is explained in this specification can be implemented by means of hardware, software, or a combination of hardware and software. If the series of processing that is explained in this specification is implemented by means of software, a set of computer-readable instructions may be installed in a memory of a computer that is built in dedicated hardware or installed in a general purpose computer that is capable of performing various kinds of processing. For example, the computer-readable instructions may be pre-stored in a computer-readable recording medium. The computer-readable instructions may be installed on a computer from a recording medium, or the computer-readable instructions may be received via a network such as LAN (Local Area Network) or the Internet and then installed on a recording medium such as an internal/integral hard disk or the like.

Note that computer-readable instructions according to an aspect of the advancement are, for example, a computer program that can be provided to a general purpose computer system that can execute various program codes in a computer-readable form of a storage medium or a communication medium. Since such a program is provided in the computer-readable form, processing is achieved in accordance with the program on the computer system.

Further, various kinds of processing that are described in this specification are not necessarily executed in time series in accordance with the order of appearance in this specification. That is, depending on the processing capability of an apparatus/apparatuses that performs processing and/or according to need, processing may be performed in a parallel manner or on an individual basis. The term "system" used in this specification means a logical set of a plurality of apparatuses. It should be noted that the apparatuses are not necessarily built in the same single frame/housing.

As explained above, an image processing system according to an exemplary embodiment of the invention includes a plurality of service-offering servers, a client that uses services offered by the plurality of service-offering servers, and an interchange server that performs intermediary processing when the client uses a service. In such a configuration, the client performs communication with the interchange server while using a common API when using any service among a plurality of services different from one another, which are offered by the plurality of service-offering servers. The interchange server uses a unique API, which is unique to the service-offering server that offers the service selected by the client, so as to execute a processing sequence that is unique to the service-offering server. Such a configuration makes it possible for the client to use any service among services offered by the plurality of service-offering servers with the use of a common API without any need to use a unique API, which is unique to each of the plurality of service-offering servers.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of causing an interchange server to intermediate communication between a client device and a plurality of service-offering servers, the method comprising:
generating a uniform user interface at the client device in accordance with a common API, the common API being independent of a plurality of server-specific APIs, each of the plurality of server-specific APIs corresponding to a respective one of the plurality of service-offering servers, the plurality of server-specific APIs being stored in an electronic memory of the interchange server;
receiving, at the interchange server, input data entered into the uniform user interface, the input data including selection of a service corresponding to a desired service-offering server of the plurality of service offering servers;
translating the input data, at the interchange server, in accordance with a respective one of the server-specific APIs corresponding to the desired service-offering server; and
transmitting the translated input data from the interchange server to the desired service-offering server in accordance with the respective one of the plurality of server-specific APIs, a response from the desired service-offering server being translated and transmitted to the client device according to the common API,
wherein the common API includes a login function to log the client device onto the desired service-offering server, an albums function to return, via the interchange server to the client device, a listing of data groups stored on the desired service-offering server, the data groups being associated with the client device at the desired service-offering server, a new album function to generate, via the interchange server, a new data group in the desired service-offering server, an assets function to return, via the interchange server to the client device, a list of assets stored on the desired service-offering server, the list of assets being associated with the client device at the desired service-offering server, an image function to return selected data via the interchange server to the client device, the selected data being displayed on a display of the client device, and an upload function to upload the input data, via the interchange server, to the desired service-offering server.

2. The method according to claim 1, further comprising: determining, at the interchange server, new service-offering servers; and storing, in the electronic memory of the interchange server, server-specific APIs corresponding to the new service-offering servers.

3. The method according to claim 1, further comprising:
determining, at the interchange server, available services on the plurality of service-offering servers;
transmitting a list of the available services to the client device in accordance with the common API, the available services being incorporated into the uniform user interface; and
removing services corresponding to unavailable service-offering servers from the uniform user interface.

4. The method according to claim 1, further comprising: validating, at the interchange server, the input data using a machine-specific information corresponding to the client device, the machine-specific information being previously stored in the interchange server.

5. The method according to claim 4, further comprising: generating a checksum at the client device using the machine specific information; appending the checksum to the input data at the client device; and verifying the checksum at the interchange server using the machine-specific information.

6. The method according to claim 1, wherein the common API generates one of XML-formatted data and JSON-formatted data.

7. An interchange server interposed between a client device and a plurality of service-offering servers, comprising:
a CPU coupled to an electronic memory and configured to communicate with the client device according to a common API, data received from the client device including selection of a service provided by a desired one of the service-offering servers;
translate the data received from the client device in accordance with a respective one of a plurality of server-specific APIs stored in the electronic memory of the interchange server, each of the server-specific APIs corresponding to one of the plurality of service-offering servers, the common API being independent from the plurality of servier-specific APIs; and
communicate, independently of the client interface unit, with the desired service-offering server in accordance with the respective one of the plurality of server-specific APIs, a response received from the desired service-offering server being translated and sent in accordance with the common API to the client device, wherein the common API provides a uniform interface to access services offered by the plurality of service-offering servers via the plurality of server-specific APIs, wherein the CPU is further configured to determine services provided by the plurality of service-offering servers, determine groups of data stored on the desired service-offering server, generate a new group of data in the desired service-offering server, request selected data via the respective one of the plurality of server-specific APIs, the selected data being supplied to the client device via the common API, the selected data being selected at the client device, and to supply data received from the client to the desired service-offering server via the respective one of the plurality of server-specific APIs.

8. The interchange server according to claim 7, wherein the common API is used to generate at least one of XML-formatted data and JSON-formatted data.

9. The interchange server according to claim 7, wherein the CPU dynamically updates the plurality of different server-specific APIs in response to updates by the plurality of service-offering servers.

10. The interchange server according to claim 7, wherein the CPU dynamically stores new server-specific APIs corresponding to newly detected service-offering servers and dynamically removes server-specific APIs corresponding to unavailable service-offering servers.

11. The interchange server according to claim 7, wherein the CPU is further configured to validate the data received from the client device in accordance with machine-specific information corresponding to the client device, the machine-specific information being previously stored in the interchange server.

12. The interchange server according to claim 11, wherein the CPU validates a checksum generated by the client device in accordance with the machine-specific information.

13. A non-transitory computer-readable medium storing computer-readable instructions thereon, the computer-readable instructions when executed by a computer cause the computer to perform the method comprising:

generating a uniform user interface at a client device in accordance with a common API, the common API being independent of a plurality of server-specific APIs, each of the plurality of server-specific APIs corresponding to a respective one of a plurality of service-offering servers, the plurality of server-specific APIs being stored in an electronic memory of an interchange server; receiving, at the interchange server, input data entered into the uniform user interface, the input data including selection of a service corresponding to a desired service-offering server of the plurality of service offering servers;

translating the input data in accordance with a respective one of the server-specific APIs corresponding to the desired service-offering server; and transmitting the translated input data from the interchange server to the desired service-offering server in accordance with the respective one of the plurality of server-specific APIs, a response from the desired service-offering server being translated and transmitted to the client device according to the common API, wherein the common API includes a login function to log the client device onto the desired service-offering server, an albums function to return, via the interchange server to the client device, a listing of data groups stored on the desired service-offering server, the data groups being associated with the client device at the desired service-offering server, a new album function to generate, via the interchange server, a new data group in the desired service-offering server, an assets function to return, via the interchange server to the client device, a list of assets stored on the desired service-offering server, the list of assets being associated with the client device at the desired service-offering server, an image function to return selected data via the interchange server to the client device, the selected data being displayed on a display of the client device, and an upload function to upload the input data, via the interchange server, to the desired service-offering server.

14. The non-transitory computer-readable medium according to claim 13, further comprising: validating the input data using machine-specific information corresponding to the client device, the machine specific-information being previously stored in the interchange server.

15. The non-transitory computer-readable medium according to claim 14, further comprising: generating a checksum at the client device using the machine-specific information; appending the checksum to the input data at the client device; and verifying the checksum at the interchange server using the machine-specific information.

16. The non-transitory computer-readable medium according to 13, further comprising: determining new service-offering servers; and storing, in the electronic memory of the interchange server, server-specific APIs corresponding to the new service-offering servers.

17. The non-transitory computer-readable medium according to claim 13, further comprising: determining available services on the plurality of service-offering servers; transmitting a list of the available services from the interchange server to the client device in accordance with the common API, the available services being incorporated into the uniform user interface; and removing services corresponding to unavailable service-offering servers from the uniform user interface.

18. The non-transitory computer-readable medium according to claim 13, wherein the common API generates one of XML-formatted data and JSON-formatted data.

* * * * *